(12) United States Patent
Albrecht et al.

(10) Patent No.: US 7,389,468 B2
(45) Date of Patent: Jun. 17, 2008

(54) WRITING AND READING OF DATA IN PROBE-BASED DATA STORAGE DEVICES

(75) Inventors: Thomas Albrecht, San Jose, CA (US); Theodore Antonakopoulos, Patras (GR); Giovanni Cherubini, Rueschlikon (CH); Ajay Dholakia, Gattikon (CH); Evangelos S. Eleftheriou, Zurich (CH); Charalampos Pozidis, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/945,226

(22) Filed: Sep. 20, 2004

(65) Prior Publication Data

US 2006/0064624 A1 Mar. 23, 2006

(51) Int. Cl.
 *H03M 13/00* (2006.01)
(52) U.S. Cl. .................................. 714/763; 714/755
(58) Field of Classification Search ................ 714/763, 714/755
 See application file for complete search history.

(56) References Cited

U.S. PATENT DOCUMENTS

| | | | | |
|---|---|---|---|---|
| 4,680,764 A | * | 7/1987 | Suzuki et al. ............... | 714/756 |
| 4,688,225 A | * | 8/1987 | Fukami et al. .............. | 714/755 |
| 5,369,652 A | * | 11/1994 | Bailey et al. ................ | 714/755 |
| 5,392,299 A | * | 2/1995 | Rhines et al. ............... | 714/756 |
| 6,158,038 A | * | 12/2000 | Yamawaki et al. ......... | 714/755 |
| 6,295,596 B1 | * | 9/2001 | Hirabayashi et al. ....... | 714/762 |
| 7,191,379 B2 | * | 3/2007 | Adelmann et al. .......... | 714/758 |
| 2002/0157045 A1 | * | 10/2002 | Hwang et al. .............. | 714/704 |

OTHER PUBLICATIONS

E Eleftheriou, P Bächtold, G Cherubini, etc., A Nanotechnology-based Approach to Data Storage. Proceedings of VLDB, 2003.*

* cited by examiner

*Primary Examiner*—Joseph Torres
(74) *Attorney, Agent, or Firm*—Michael J. Buchenhorner; Vazken Alexanian

(57) ABSTRACT

Methods and apparatus are provided for controlling writing and reading of data in an array of A storage fields of a probe-based data storage device in which data is written to and read from the array of storage fields by a corresponding array of probes. One method provides error-tolerance by exploiting the inherent parallelism of the probe storage array. A user data block to be written to the A-field array is first coded to produce a plurality of C-byte codewords, such that $r.C = k_1.A$ where r is the number of codewords and $k_1$ is an integer $\geq 1$. A sub-blocks of $k_1$ bytes are produced from the codewords by selecting successive bytes of each sub-block cyclically from the r codewords. The A sub-blocks are then written via respective probes to the corresponding storage fields of the storage field array.

15 Claims, 7 Drawing Sheets

WRITING AND READING OF DATA IN PROBE-BASED DATA STORAGE DEVICES

CROSS-REFERENCE TO RELATED APPLICATIONS

This application claims priority under 35 U.S.C. Section. 119 to EPO Application No. 03405698.6 filed on Sep. 26, 2003, in the European Patent Office (EPO), the entire contents of which are incorporated herein by reference.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates generally to probe-based data storage devices. Particular embodiments of the invention provide methods and apparatus for controlling data write and read processes in such devices.

BACKGROUND OF THE INVENTION

In probe-based data storage devices, stored data is represented on a storage surface by the presence and absence of indentations, or 'pits', which are formed in the surface by a probe of the device. One example of such a device, based on the AFM (Atomic Force Microscope), is detailed in IBM Journal of Research & Development, Volume 44, No. 3, May 2000, pp323-340, "The 'Millipede'—More Than One Thousand Tips for Future AFM Data Storage", Vettiger et al., and the references cited therein. In this device, the probe is a nanometer-sharp tip mounted on the end of a microfabricated cantilever. The tip can be moved over the surface of a storage medium in the form of a polymer substrate. A mechanism is provided for heating the tip, allowing the tip to penetrate the polymer surface to create a pit. Such a pit typically represents a bit of value '1', a bit of value '0' being represented by the absence of a pit at a bit position on the storage surface. In a read-scan mode, the thermomechanical probe mechanism can be used to read back data by detecting the deflection of the cantilever as the tip is moved over the pattern of pits in the storage surface.

As in the device of the above reference, probe-based storage devices may employ an integrated array of individually-addressable probes in order to increase data rates. Each probe of the array can read and write data within its own storage field as the array is moved relative to the storage surface. This is illustrated schematically in FIG. 1 of the accompanying drawings. Here, a storage surface 1 provides a regular array of storage fields arranged in M rows of N storage fields. Each storage field is labeled in the figure by (row number, column number). As indicated schematically by probes P in the figure, a corresponding array of M rows of N probes is provided such that each probe can read and write data in a respective storage field. In particular, as the probe array is moved relative to the storage surface, each probe P can be moved through a series of p rows of q bit-positions as represented schematically in the enlarged section of the figure. In each storage field, data can be written by writing bits at successive bit-positions along a row, and can similarly be read back as the probe is advanced through the appropriate series of bit positions.

A parallel addressing scheme can be used for the probe array, whereby multiple probes can be addressed simultaneously for the read/write operation at a given array position. In the above reference for example, the parallel addressing scheme operates via a grid of row and column address lines, such that probes in the same row are connected to the same row-address line, and probes in the same column are connected to the same column-address line. Probes in a given row are activated simultaneously for the read or write operation at a given bit position, successive rows being activated in turn until the entire array has been addressed. The probe array is then moved to the next bit position, and the operation is repeated. In a given write process, the bit sequences actually written to the storage surface may be derived from the input user data by various processing stages. For example, a type of RLL (Run-Length Limited) (d,k)-constraint code may be applied in order to increase areal density on the storage surface. At present, the use of probe arrays promises storage densities of 1 Tb/inch$^2$ or even higher within a very small form factor and low power consumption, offering a new generation of ultrahigh density storage devices.

Various types of errors can be encountered in probe-based storage devices. These errors are typically related to surface damage such as scratches in the storage surface, to noise or to abnormal conditions during the read/write process, e.g. vibrations due to external shocks. In general in storage devices, such errors are typically handled using special types of error correcting codes (ECC) and proper data interleaving. While such mechanisms can be applied in conventional manner in probe-based storage devices, the operation of probe-based arrays as described above is somewhat different to the conventional devices in which these mechanisms are customarily used.

Another important consideration in probe-based storage relates to interface operation. Probe-based storage devices may use various interfaces for exchanging information with other processing devices, such as host processors, terminal processing units etc., in a data processing system. These interfaces may have various speeds, data bus widths and data formats. Different formats impose different sizes of user data blocks to be exchanged with the storage device. For example, one of the most common interfaces is the Compact Flash interface which uses one or more blocks of data, called 'sectors', each having a size of 512 (8-bit) bytes. Another well known interface is the Multimedia Card interface which does not require a specific sector size but allows an application to use a block of data which depends on the characteristics of the application, such as audio or video storage, multimedia streams, etc. The ability to accommodate such different interfaces would be highly desirable in probe-based storage devices.

SUMMARY OF THE INVENTION

A first aspect of the present invention provides a method for writing a user data block to an array of A storage fields of a probe-based data storage device in which data is written to the array of storage fields by a corresponding array of probes. The method comprises:

coding the user data block to produce a plurality of C-byte codewords such that $r*C = k_1*A$ where r is the number of codewords and $k_1$ is an integer $\geq 1$;

producing A sub-blocks of $k_1$ bytes from the codewords by selecting successive bytes of each sub-block cyclically from the r codewords; and writing the A sub-blocks via respective probes to the corresponding storage fields of the storage field array.

In embodiments of this aspect of the invention, a given user data block is written to the array of A storage fields by first coding the user block to produce r codewords of C bytes. The values of r and C are selected here so as to satisfy the relationship $r*C=k_1*A$, where $k_1 \geq 1$. Thus, the total number of bytes produced from the user block can be written as $k_1$ bytes in each of the A storage fields. (Note that the term 'byte' is used herein in its most general sense to represent a unit of data having any defined number of bits, and not necessarily the usual 8-bits). A $k_1$-byte sub-blocks are then produced from the r codewords, i.e. one sub-block for each of the A storage fields.

Successive bytes of each sub-block are selected cyclically from the r codewords. Hence bytes from the same codeword are always r bytes apart in each sub-block. Since each sub-block is then written to a different storage field of the array, bytes from the same codeword are always r-bytes apart in each storage field. This gives the maximum spacing of bytes from individual codewords in all storage fields, reducing the likelihood of errors preventing correct recovery of the codewords, and hence the original user block. In particular, the distribution of codewords across the A storage fields, and maximal byte-spacing for individual codewords in each storage field, minimizes the number of bytes from any given codeword that are likely to be affected by localized damage to the storage surface.

In addition, since bytes are written sequentially by the probe in a given storage field, bytes from the same codeword are only written once every r-bytes, thereby reducing the effect of errors due to temporary abnormalities such as shocks. Moreover, by appropriate selection of the values of r and C in the coding process, the system can be employed with any array size A and can accommodate any size of user data block. Methods embodying this aspect of the invention thus exploit the inherent parallelism of the probe-based array to provide an efficient and flexible system for writing user data blocks with a high degree of tolerance to errors.

Various coding processes may be employed to generate the r codewords from the user data block, though typically each codeword will include an error correction code for that individual codeword. Also, the sub-blocks may undergo various processing stages to achieve the final form in which the sub-blocks are actually written on the storage surface. For example, the use of (d, k)-constraint codes allows increased bit-densities on the storage surface as mentioned earlier. Thus, the sub-blocks are preferably (d, k)-coded and written to the storage fields in their coded form.

While the array of storage fields will typically be a regular array, arranged in rows and columns of storage fields, operation of the write process is independent of the particular arrangement of the storage field array. Moreover, the A-field array may comprise all fields in a given physical array or may be a sub-array comprising a logical subset of the overall physical array of storage fields.

The first aspect of the present invention can preferably be combined with a second aspect of the present invention. The concept of logical sub-arrays is exploited in this second aspect of the invention which provides a method for variable-rate read/write operation of a probe-based data storage device in which data is written to and read from an array of A storage fields by a corresponding array of probes. The method comprises:

receiving input data blocks, each writable in $A/k_0$ storage fields where $k_0$ is an integer $\geq 2$;

for successive groups of $k_0$ blocks, writing the $k_0$ blocks to respective sub-arrays, each of $A/k_0$ storage fields, of the storage field array by selectively writing at one of a series of rates, ranging from 1 block at a time to $k_0$ blocks at a time, in dependence on a desired data write-rate; and reading the blocks from the sub-arrays by selectively reading at one of a series of rates, ranging from 1 sub-array at a time to $k_0$ sub-arrays at a time, in dependence on a desired data read-rate.

In methods embodying this aspect of the invention, the array of A storage fields is logically divided into $k_0$ sub-arrays, each sub-array having $A/k_0$ storage fields, where $k_0 \geq 2$. A given write operation to the array is performed for input data blocks which are each writable in $A/k_0$ storage fields, i.e. in one sub-array. (The overall write process may of course involve various stages of processing input data to achieve the final form in which the data is actually stored in the storage array. The point here is that each input data block is of a size such that, after any processing inherent in the write process, the entire block can be written within $A/k_0$ storage fields). In each group of $k_0$ input data blocks, each block is written to a different one of the $k_0$ sub-arrays.

However, the inherent parallelism of the probe storage array is exploited here to allow the write process to be selectively performed at one of a series of rates. The lowest selectable rate is achieved by writing the $k_0$ blocks one at a time to their respective sub-arrays, so that each sub-array is addressed in turn until all $k_0$ blocks have been written to the array. The highest selectable rate is achieved by writing $k_0$ blocks at a time, so that all sub-arrays are addressed in parallel to write the $k_0$ blocks to their respective sub-arrays. The series of selectable rates may further include one or more intermediate rates corresponding to writing the $k_0$ blocks 2, 3, 4, . . . etc., blocks at a time, depending on the value of $k_0$, until all $k_0$ blocks have been written. In any given input data write process, the particular rate for writing the $k_0$ blocks is selected in dependence on a desired data write-rate for that input data, as determined, for example, based on the particular interface from which the input data originates.

Similarly, stored data can be selectively read from the array at one of a series of rates. In particular, successive groups of $k_0$ blocks stored in the array can be read back by reading one sub-array at a time (giving the lowest selectable read-rate), or $k_0$ sub-arrays at a time (giving the highest selectable read-rate), and preferably also at one or more intermediate rates corresponding to reading the $k_0$ sub-arrays 2, 3, 4, . . . etc., sub-arrays at a time, depending on the value of $k_0$. The particular rate at which a given read operation is performed is selected in dependence on a desired data read-rate, determined, for example, based on the particular interface to which the data is to be supplied.

Thus, methods embodying this aspect of the invention exploit the concept of sub-arrays to allow read/write operations to be performed at variable rates. This allows probe-based storage devices to accommodate differing data rates of a number of different interfaces with which data may be exchanged in operation. Data written at different rates can coexist on the storage surface, and stored data can be read back at any of the available read-rates, regardless of the rate at which that data was originally written. As a result, embodiments of this aspect of the invention offer highly flexible probe-based storage systems.

In preferred embodiments, with suitable values of $k_0$, the series of write and/or read rates will include a plurality of intermediate rates between the lowest and highest rates. For a given value of $k_0$, sub-arrays may in principle be written to, or read from, by writing/reading 1, 2, 3, 4, . . . ($k_0$–1), or $k_0$ sub-arrays at a time until all $k_0$ sub-arrays have been written/read, though not all of these values will provide different overall write- or read-rates as discussed further below.

While some devices may have a series of selectable read/write rates for operation with a number of different interfaces, other devices may be configured on a similar basis to operate with particular interfaces for which a single write-rate and a single read-rate are required. Thus, the first aspect of the present invention can preferably be combined with a third aspect of the present invention. Thus, a third aspect of the present invention provides another method for operating a probe-based data storage device in which data is written to and read from an array of A storage fields by a corresponding array of probes. This method comprises:

receiving input data blocks, each writable in $A/k_0$ storage fields where $k_0$ is an integer $\geq 2$;

for successive groups of $k_0$ blocks, writing the $k_0$ blocks to respective sub-arrays, each of $A/k_0$ storage fields, of the storage field array by writing x blocks at a time, where x is an integer in the range $1 \leq x \leq k_0$; and reading the blocks from the sub-arrays by reading y sub-arrays at a time, where y is an integer in the range $1 \leq y \leq k_0$.

Methods embodying this aspect of the invention use the sub-array concept to enable a probe-based storage device to operate at particular write- and read-rates, for example as required by a particular interface. Specific embodiments of this aspect of the invention may include one or more of the features: $1 \leq x \leq k_0-1$; $1 \leq y \leq k_0 1$; and $x \neq y$. In any case, in common with embodiments of the second aspect of the invention, methods embodying the third aspect of the invention exploit the general concept of sub-arrays, whereby $k_0$ blocks are written/read in $k_0$ sub-arrays by addressing a number of sub-arrays in parallel, to provide a desired data rate.

In methods embodying the second or third aspect of the invention, the array of A storage fields, and sub-arrays of $A/k_0$ storage fields, will typically be regular arrays comprising rows and columns of storage fields, though this is not necessary for system operation. Moreover, the A-field array need not comprise all fields in a physical array of storage fields, but may itself be a logical sub-array of the physical array.

In embodiments of the second and third aspects of the invention, user data may be supplied for storage in appropriate input data blocks, or user data blocks may be processed in some way to generate the input data blocks for the write process. For example, in preferred embodiments, the method may include coding user data to produce the input data blocks with a block size of $k_1(A/k_0)$ bytes, where $k_1$ is an integer $\leq 1$. Specifically, a user data block may be coded to produce an input data block comprising a plurality of C-byte codewords, such that $r.C=k_1(A/k_0)$ where r is the number of codewords. Here, each user block can be written to a sub-array of $A/k_0$ storage fields by a method embodying the first aspect of the invention. In general, where features are described herein with reference to a method embodying the invention, corresponding features may be provided in apparatus embodying the invention, and vice versa. Thus, respective further aspects of the invention provide corresponding apparatus. Additional aspects of the invention provide probe-based data storage devices incorporating such apparatus.

BRIEF DESCRIPTION OF THE DRAWINGS

Preferred embodiments of the invention will now be described, by way of example, with reference to the accompanying drawings in which.

DETAILED DESCRIPTION

Figure 1:
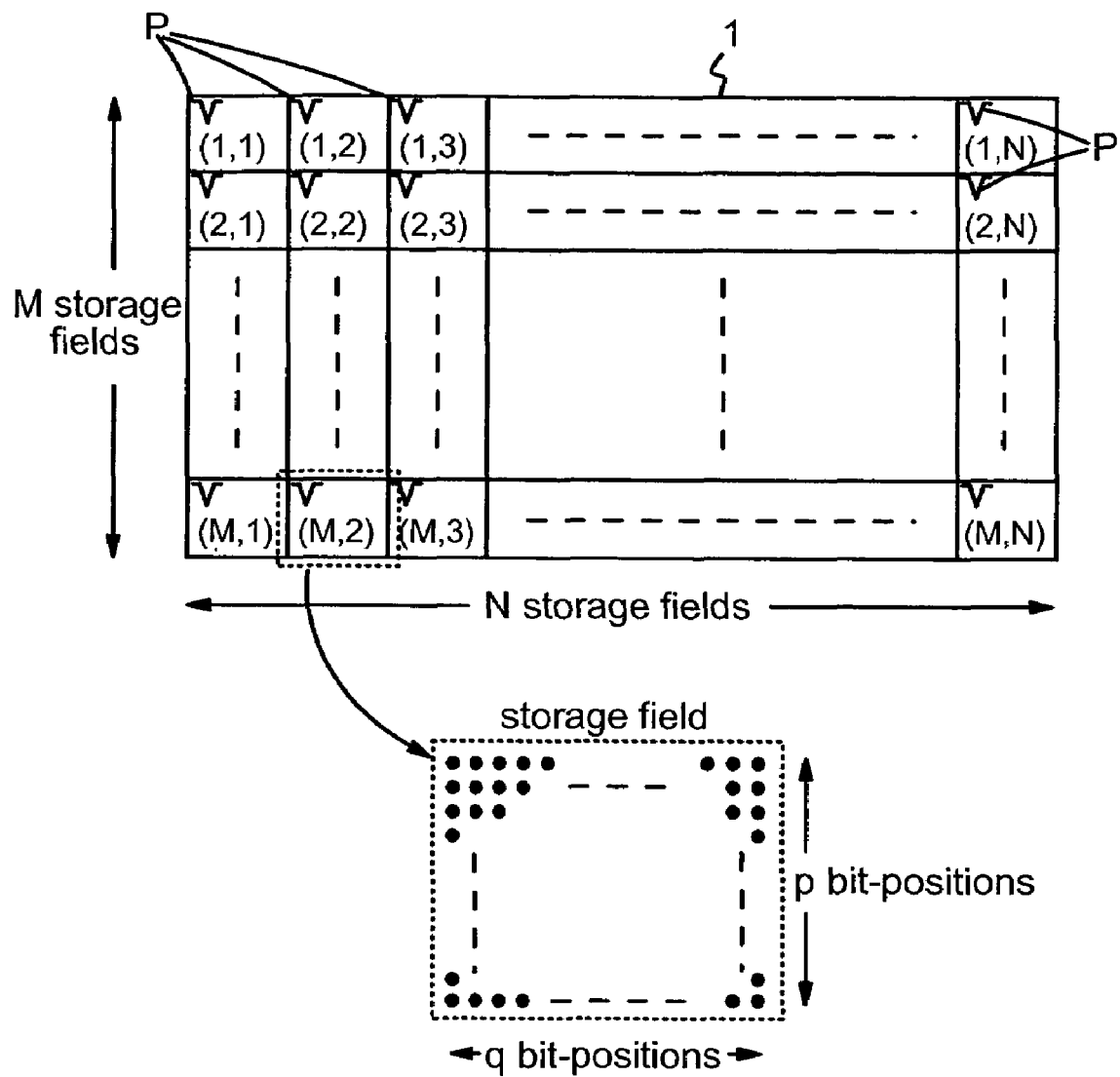
FIG. 1 is a schematic illustration of a probe-based storage array.
Figure 2:
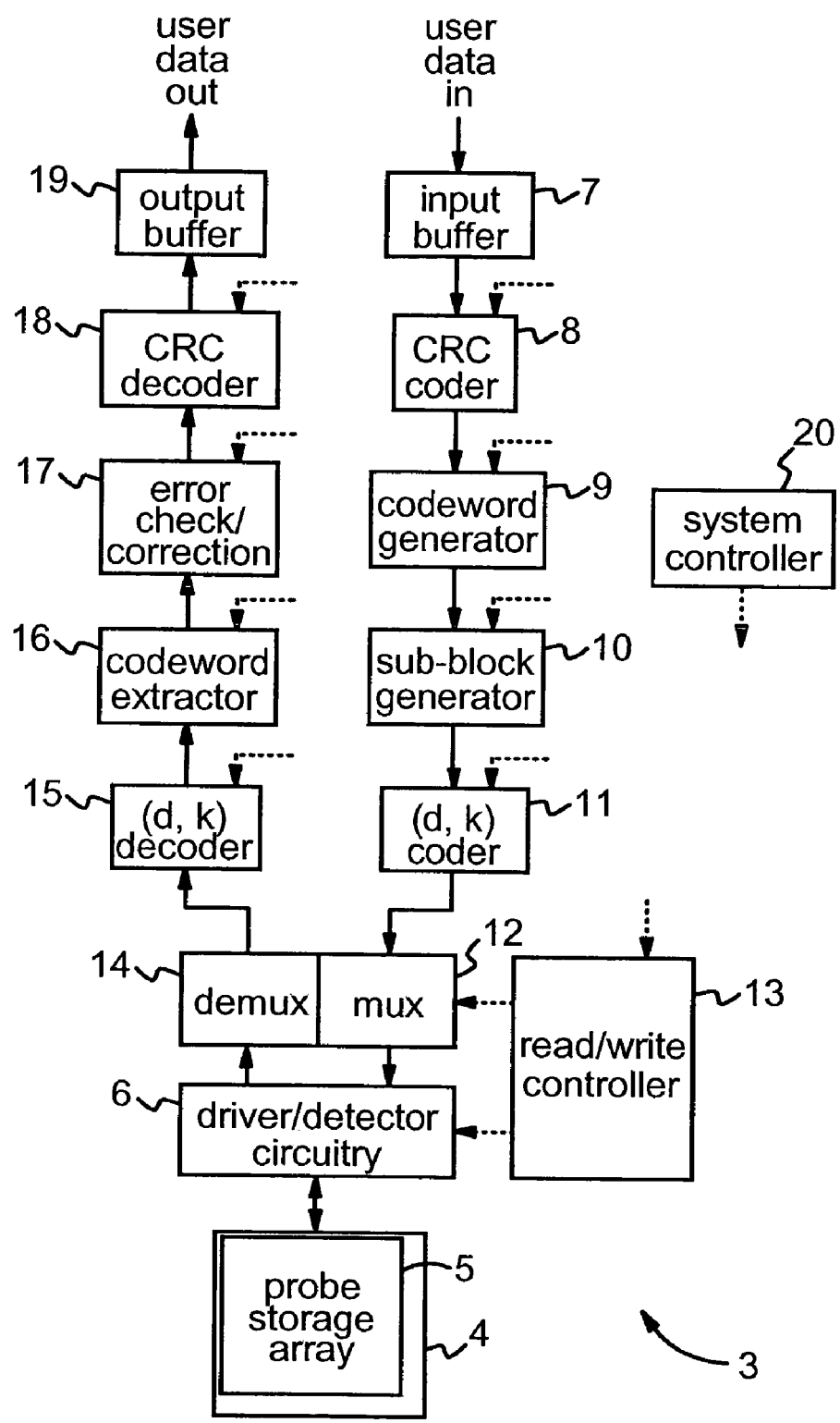
FIG. 2 is a schematic block diagram of a first probe-based storage device embodying the invention.

The block diagram of FIG. 2 shows a probe-based storage device 3 incorporating apparatus embodying the first aspect of the invention for controlling writing and reading of data. The device 3 has a probe storage array generally as described with reference to FIG. 1, comprising a storage surface 4 providing the array of A storage fields, and a corresponding array of probes 5 such that each probe can read and write data in a respective storage field. The probe array is activated to read and write data by array driver/detector circuitry 6 of the general type described in the document referenced above. The read/write process is controlled by control apparatus comprising components 7 to 20 in the figure. Writing of data is performed by components 7 to 13, and reading of data is performed by components 13 to 19. As indicated by dotted arrows in the figure, components 8 to 11, 13 and 15 to 18 receive control inputs from a system controller 20 for configuration purposes as discussed further below.

Considering first the write process, blocks of user data to be written to the array are received in use, from a device or application interface for example, by input buffer 7. A cyclical redundancy check (CRC) code is added to each block of user data by CRC coder 8, and the user block, with added CRC, is then output to codeword generator 9. The codeword generator codes the received user block to produce a plurality of codewords. The block of codewords is then supplied to sub-block generator 10 which produces a set of sub-blocks from the codewords. The sub-blocks are then further coded by (d,k)-coder 11 to produce the final form in which the original user data block will be written to storage surface 4. Multiplexer (mux) 12 operates under control of read/write controller 13 to supply the coded sub-blocks bit by bit to the array driver 6. Under control of read/write controller 13, the array driver then drives the individual probes of probe array 5 to write the coded sub-blocks to the array of storage fields on storage surface 4. The various steps of the foregoing write process will be described in more detail below.

During the read process, read/write controller 13 controls array driver 6 to activate probe array 5 in a read mode to read the coded sub-blocks from storage surface 4. De-multiplexer (demux) 14 operates under control of read/write controller 13 to supply the coded sub-blocks bit by bit to (d,k)-decoder 15. This decoder performs the inverse of the coding implemented by (d,k)-coder 11 to recover the uncoded sub-blocks. These are then supplied to codeword extractor 16 which performs the inverse of the processing performed by sub-block generator 10 so as to extract the original block of codewords. Errors in the codewords are identified and corrected where possible by error check/correction circuitry 17, and the resulting codewords are output to CRC decoder 18. CRC decoder 18 checks the integrity of the data at the output of error check/correction circuitry 17. If the user block recovered from the codewords is error-free, it is supplied via output buffer 19 to the interface with the application or device requiring the user data. If the recovered user block is not error-free, the CRC decoder alerts system controller 20 which then controls the device to re-read the desired user block from storage surface 4.

For ease of understanding, the components of the control apparatus for performing the various steps of the read/write control process outlined above are represented as distinct components in the schematic of FIG. 2. However, it will be understood that, in general, the apparatus may be implemented by control logic, comprising hardware or a combination of hardware and software, and that individual components in FIG. 2 may be implemented as functional stages in operation of the control logic. For example, individual components may be implemented as functional stages in operation of a processor controlling operation of the probe storage array.

Figure 3A:
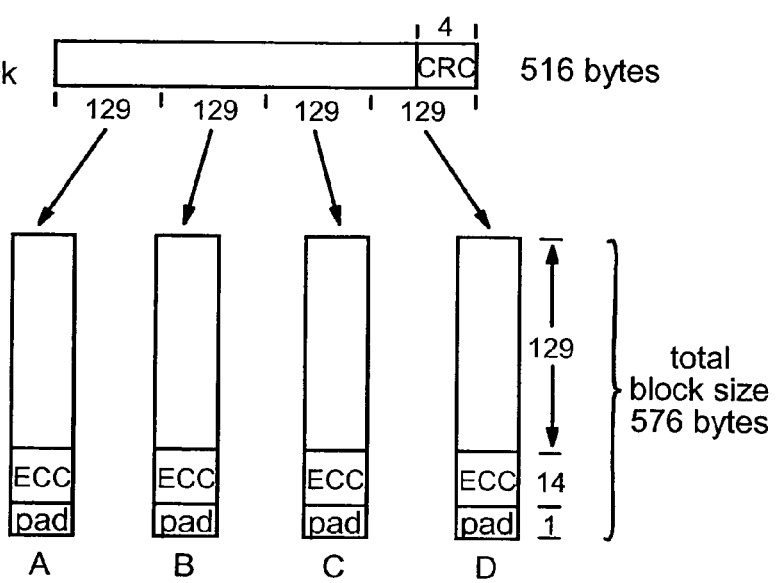
FIGS. 3*a* and 3*b* illustrate processing steps in operation of the embodiment of FIG. 2.
Figure 3B:
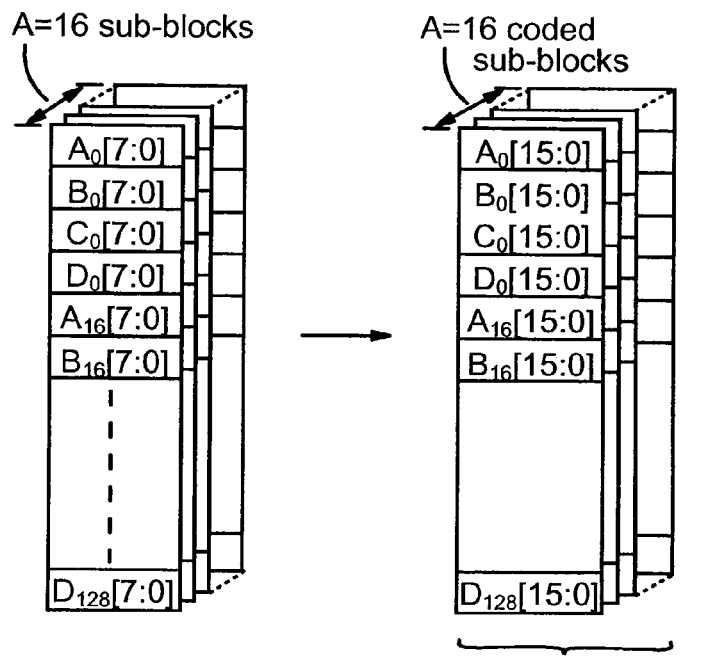

The details of the processing steps outlined above are best understood by considering an example of the process for particular device operating parameters. Such an example is illustrated in FIGS. 3a and 3b. These figures show the steps of the write process for a simple example with a 4×4 probe storage array, providing A=16 storage fields arranged in four rows and four columns, with a corresponding array of 16 probes. The user data to be written in this example has a block size of 512 8-bit bytes. The steps of the write process outlined above are indicated on the left-hand side of the figures, with the adjacent diagrams illustrating the operations performed by these steps in this example.

Commencing at the top of FIG. 3a, the process begins with the first 512-byte user block received in input buffer 7. Next, the CRC code is added by CRC coder 8. In this example, a 4-byte CRC code is added to give a total block size of 516 bytes. This block is then coded in codeword generator 9 to produce r codewords, each of C bytes, such that the relationship $r*C=k_1*A$ is satisfied, where $k_1$ is an integer$\geq 1$. In this example, r=4 codewords are generated, the codewords being labeled A, B, C and D in the figure. In general, the codewords may be generated in various ways, but in this example each codeword includes a 129-byte segment of the CRC-coded user block to which an error-correction code (ECC) and padding are added as indicated in the figure. Each error correction code is generated from the data of the individual codeword, and takes up 14 bytes in this example. One byte of padding is added to each codeword to give a total codeword length of C=144 bytes. In general, the number of padding bytes added to each codeword is selected to ensure that r*C is integrally divisible by A, i.e. to give an integral value of $k_1$. (Note also that padding may be added with the CRC code in the preceding step to give a total block size integrally divisible by r, though this is not necessary in the present example). The resulting four codewords give a total block size of $r*C=4*144=576$ bytes. Thus, with A=16 in this case, the relationship $r*C=k_1*A$ is satisfied with $k_1=36$.

The next diagram in FIG. 3a shows the block of four codewords A to D with the 144 bytes of each codeword labeled $A_0, A_1, A_2, \ldots A_{143}$, etc. to better demonstrate the next processing step. In this step, the sub-block generator 10 produces A sub-blocks, each of $k_1$ bytes, from the four codewords. In this example, therefore, 16 sub-blocks, each of 36 bytes, are generated from the codewords. Each sub-block is produced by selecting 36 bytes from the codewords, with successive bytes of the sub-block being selected cyclically from the four codewords. In this example, the first byte of each sub-block is selected from codeword A, the second byte is selected from codeword B, the third from codeword C, the fourth from codeword D, the fifth from codeword A again, and so on. The specific mapping of codeword bytes to sub-blocks in this case is indicated in the last diagram of FIG. 3a which shows the sixteen sub-blocks. As illustrated, bytes $A_0$ to $D_0$ form the first four bytes of the first sub-block. Bytes $A_1$ to $D_1$ form the first four bytes of the second sub-block, and so on up to bytes $A_{15}$ to $D_{15}$ which form the first four bytes of the last sub-block. Bytes $A_{16}$ to $D_{16}$ then form the second four bytes of the first sub-block, bytes $A_{17}$ to $D_{17}$ form the second four bytes of the second sub-block, etc., this pattern continuing until all codeword bytes have been selected and the sub-blocks are complete.

The subsequent steps of the write process are illustrated in FIG. 3b. The left-hand diagram at the top of this figure represents the set of sixteen sub-blocks resulting from the preceding step. The bytes $A_0, B_0$, etc. of these sub-blocks are labeled $A_0[7:0], B_0[7:0]$, etc. signifying that each byte is an 8-bit word consisting of bits $A_0[7]$ (the most significant bit (MSB)) to $A_0[0]$ (the least significant bit (LSB)), etc. Each of these sixteen sub-blocks is coded by (d,k)-coder 11 to produce a (d,k)-coded sub-block. Specifically, each byte of each sub-block is (d,k)-coded to produce a corresponding coded byte, so that each coded sub-block contains $k_1=36$ coded bytes. In this example, we assume a (d=2,k) code of rate ½. This implies that every uncoded sub-block byte is coded into a 16-bit word (e.g. $A_0[15:0]$ etc. as shown in the right-hand diagram in the figure), though these 16-bit words will be referred to as 'bytes' hereinafter for simplicity. The (d,k)-coding is performed here to allow increased write-density on the storage surface as discussed earlier. While the use of such coding is preferred, it is not essential to operation of the invention and the details of the coding process need not be discussed here. Moreover, in some embodiments coder 11 may implement additional coding for other purposes, for example to allow direct overwriting of old, previously-written data on the storage surface, i.e. without first erasing the old data. Again, such further coding is not central to the present invention and need not be discussed in detail here.

In the final stage of the write process, read/write controller 13 controls writing of the coded sub-blocks, bit by bit, to the array of storage fields. The mapping of the coded sub-blocks to the storage fields of the array is illustrated in the bottom diagram of FIG. 3b. As illustrated, each of the sixteen coded sub-blocks is written to a respective one of the sixteen storage fields, with the bytes of each sub-block being written sequentially in each storage field. The parallel nature of the probe-based array means that the sub-blocks are written in parallel to their respective storage fields, successive bytes of each sub-block being written one bit at a time as the parallel probe array is moved through successive bit positions. Thus, under control of read-write controller 13, multiplexer 12 supplies the MSBs of the first bytes of all sixteen sub-blocks to array driver 6 which then drives the sixteen probes of probe array 5 to write these bits to respective storage fields.

The probe array 5 is then moved to the next bit position. The second bits of the first bytes of respective sub-blocks are then supplied via multiplexer 12 and written at this next bit position in respective storage fields. This process continues until the LSBs of the last bytes of respective sub-blocks have been written in the respective storage fields. As a result of this write process, the original user block is ultimately written as $k_1$ bytes in each of the A storage fields of the array.

The write process detailed above continues for successive user blocks supplied to input buffer 7 until all user blocks have been written to the array, whereupon the current write operation is complete. The stored data can be read back subsequently by reversing the above process. Thus, under control of read-write controller 13, array driver 6 drives the probe array to read the coded-sub-blocks, bit by bit, in parallel from the sixteen storage fields, successive sets of sixteen bits being supplied via demultiplexer 14 to decoder 15 until the sixteen sub-blocks have been recovered in their entirety. The original user block is then recovered as described above via components 15 to 19 of FIG. 2, the process continuing until all user blocks have been output.

It can be seen from the storage field array of FIG. 3b that the effect of the write process is to distribute the codewords generated from each input user block across the A fields of the storage array, with bytes from the same codeword always being r bytes apart, i.e. at the maximum possible spacing, in any given storage field. This minimizes the number of bytes from any individual codeword that are likely to be affected by localized damage to the storage surface. Also, since bytes are written sequentially, bytes from the same codeword are only written every r bytes, reducing the effect on individual codewords of temporary abnormalities during the write process. These factors serve to protect the codewords against the effect of error conditions in the storage device, enhancing efficacy of the error correction processes and improving overall data recovery. By exploiting the inherent parallelism of the probe storage array, the above write process thus provides a storage device with a high level of error-tolerance. Moreover, by selecting suitable values for parameters r and C, the process can be applied for any array size A and any user data block size. Indeed, in the preferred embodiment of FIG. 2, the system controller 20 allows the control apparatus to be configured, via the control inputs indicated in the figure, to employ values of r and C (and hence $k_1$) as appropriate for a given operation. For example, the values of r and C may be calculated in dependence on the user data block size and the array size A. In this regard, while the operation of the control apparatus has been described above for a physical probe storage array of size A, in other embodiments the A-field array may be a logical sub-array of a larger physical array as discussed further below. In such embodiments, the size A of the sub-array to be used in the above process may itself be selectable, providing a further degree of flexibility in the configuration process.

Note that, while the basic process of writing bytes to storage fields has been described with reference to FIG. 3b, in practice additional control data may be added in the write process. For example, it may be desirable to add header and/or trailers to individual bytes, and at the beginning and/or end of individual sub-blocks in storage fields. Such control data can be used for various purposes, e.g. to assist control and recovery processes or to support direct overwrite capability, and may include additional error coding, such as parity bits, to improve the overall error correcting capability. Note also that the allocation of individual sub-blocks to storage fields in FIG. 3b is not critical, nor is the particular codeword from which the cyclical byte-selection process begins when generating the sub-blocks. In addition, various other cyclical byte-selection processes may be employed in sub-block generator 10, one particular example being illustrated in FIG. 4. This figure shows diagrams illustrating the sub-block generation process and storage field byte-mapping in a modification to the process of FIGS. 3a and 3b. Here, successive bytes of each sub-block are selected cyclically from the four codewords as before, but the first bytes of successive sub-blocks are also selected cyclically from the codewords. Thus, the first bytes of successive codewords are $A_0, B_1, C_2, \ldots A_{15}$, resulting in the overall byte pattern indicated in the figure. The sub-blocks are then written (after (d,k)-coding as described above) to respective storage fields of the array, resulting in the byte mapping illustrated in the bottom diagram of FIG. 4.

Figure 4:
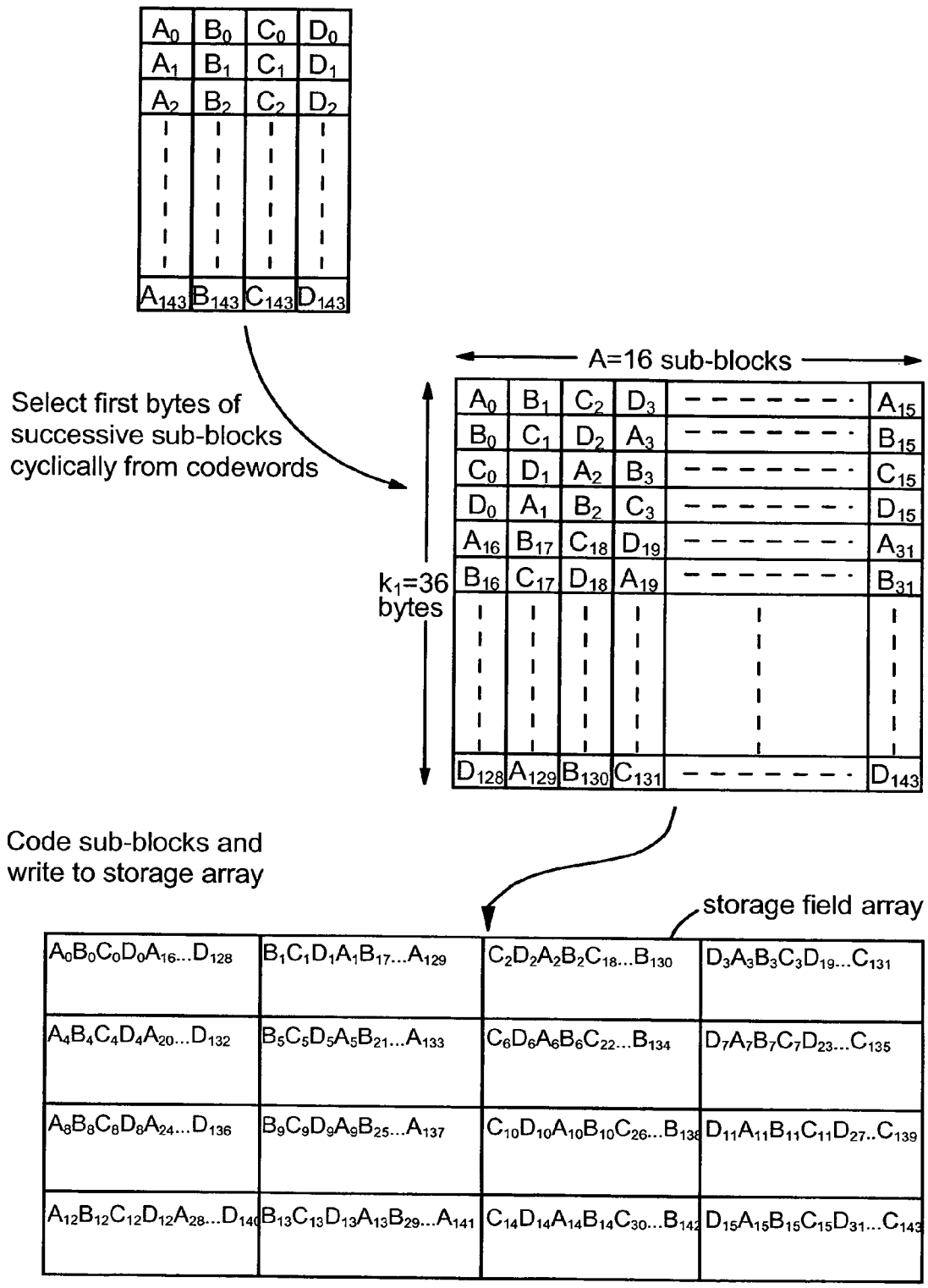
FIG. 4 illustrates alternative processing steps in a modification to the process of FIGS. 3*a* and 3*b*.

It will be seen that the modified process of FIG. 4 provides all the advantages of the process discussed above with reference to FIGS. 3a and 3b. However, the FIG. 4 process offers an additional advantage, since corresponding bit positions in the same row of storage fields are written simultaneously via the parallel addressing mechanism described earlier. With the byte-mapping of FIG. 4 only one in four of the bits written simultaneously in a given row are from the same codeword. This further reduces the likely effect on individual codewords of temporary abnormalities during the read/write process, providing a further improvement in error tolerance.

Figure 5:
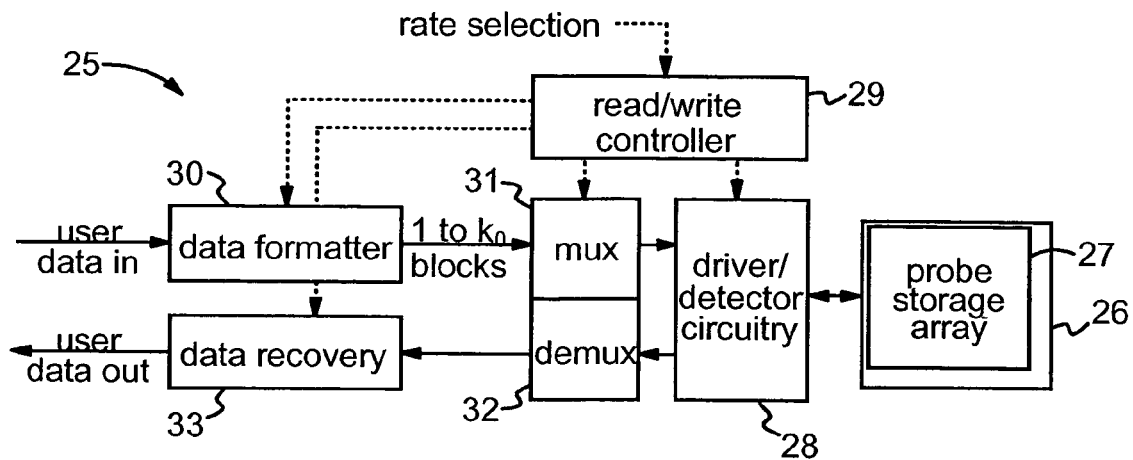
FIG. 5 is a schematic block diagram of a second probe-based storage device embodying the invention.
Figure 6:
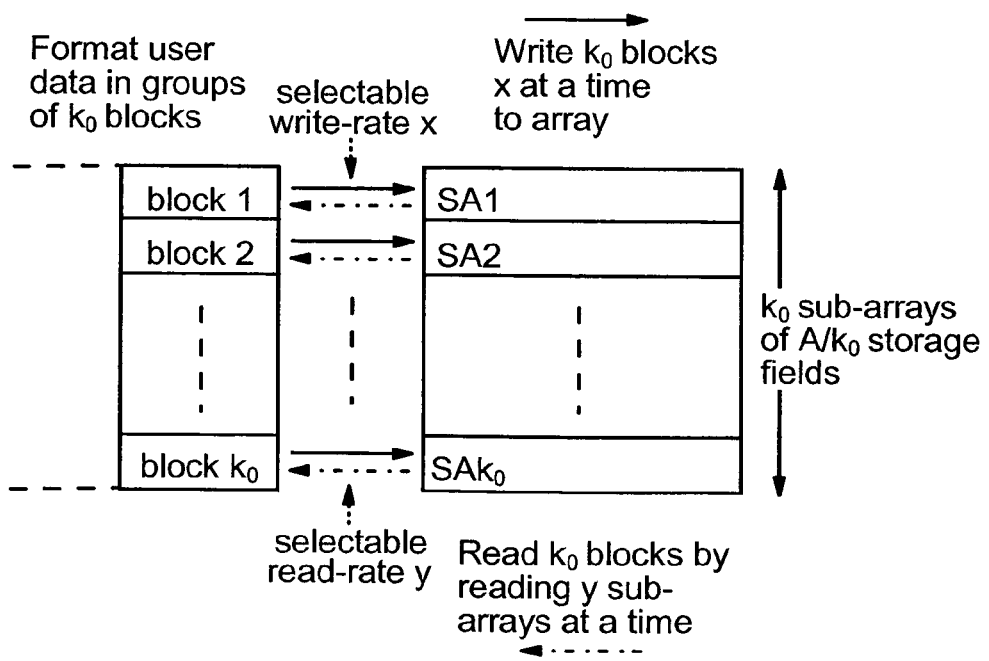
FIG. 6 illustrates the basic steps in operation of the FIG. 5 embodiment.

A second probe-based storage device will now be described with reference to FIGS. 5 and 6. This storage device incorporates apparatus embodying the second aspect of the invention for controlling writing and reading of data in a probe storage array. As shown in FIG. 5, the storage device 25 includes a probe storage array generally as described above, comprising a storage surface 26 providing the array of A storage fields, and a corresponding array of probes 27 such that each probe can read and write data in its own storage field. The probe array is activated to read and write data by array driver/detector circuitry 28 of the type described above. Read/write processes are controlled by control apparatus comprising a read/write controller 29, data formatter 30, multiplexer 31, demultiplexer 32 and data recovery block 33. As indicated by dotted arrows in the figure, components 28 and 30 to 33 receive control inputs from read/write controller 29 for the purposes explained below. Read/write controller 29 itself receives a rate selection input, for example from an overall system controller (not shown), as discussed further below. As with the FIG. 2 embodiment, the control apparatus of FIG. 5 may be implemented in general by control logic comprising hardware or a combination of hardware and software, and individual components in FIG. 5 may be implemented as functional stages in operation of the control logic.

For the purposes of read and write operations in device 25, the probe storage array is logically divided into $k_0$ sub-arrays, where $k_0$ is an integer $\geq 2$. That is, the array of A storage fields on storage surface 26 is logically divided into $k_0$ sub-arrays, each having $A/k_0$ storage fields, and the probe array 27 is similarly divided into $k_0$ logical sub-arrays, each having $A/k_0$ probes corresponding to respective storage fields of a corresponding storage field sub-array. In a given write operation, the user data stream to be written is received by the data formatter 30. Data formatter 30 operates to format the user data in groups of $k_0$ input data blocks for the subsequent write process. The size of these data blocks is such that each block can be written in $A/k_0$ storage fields, i.e. within a single sub-array. The details of the data formatting operation are not of essence here, the key point being that groups of $k_0$ blocks, each writable in a single sub-array of storage fields, are presented for the write process. For example, where the input user data is supplied in suitably sized blocks, in the simplest case the data formatter may simply comprise a $k_0$-block buffer for grouping the user data in successive groups of $k_0$ blocks. Typically, however, the data formatter will perform additional processing of user data, e.g. for error correction or other coding purposes, in producing the groups of $k_0$ data blocks for the write process. A particularly preferred embodiment of the data formatter will be described hereinafter with reference to FIG. 7.

For each group of $k_0$ blocks prepared by data formatter 30, the blocks are supplied x blocks at a time to multiplexer 31 under control of read/write controller 29. The value of x here is selected by read/write controller 29 to be one of a predetermined series of values in the range $1 \leq x \leq k_0$. The particular value of x is selected in dependence on a rate selection input supplied to read/write controller 29 and indicating a desired data write-rate for the current write operation. Thus, the $k_0$ blocks are supplied to multiplexer 31 at one of a series of rates, ranging from one block at a time to $k_0$ blocks at a time, in dependence on the required data write rate for the current operation. Under control of read/write controller 29, multiplexer 31 supplies individual bits of the $k_0$ blocks to array driver 28 which drives probe array 27 to write the blocks, bit by bit, to storage surface 26. In this process, read/write controller 29 controls multiplexer 31 and array driver 28 such that each of the $k_0$ blocks is written to a different sub-array of the overall storage array. This is illustrated in FIG. 6, where the groups of $k_0$ input blocks are indicated on the left of the figure, and the storage array divided into $k_0$ logical sub-arrays, SA1 to SA $k_0$, is indicated on the right of the figure.

It will be seen that the overall write-rate for the write operation depends on the value of x selected by read/write controller 29. For x=1, each group of $k_0$ blocks is written one block at a time to respective sub-arrays, giving the lowest overall write-rate for the device. Here, as each block is supplied via multiplexer 31, the entire probe array is moved through the series of bit positions required for writing the block, but only the probes corresponding to one of the sub-arrays SA1 to SA $k_0$ are activated by array driver 26 to write the block in that sub-array, all other probes effectively writing zeros (since a zero corresponds to no-pit at a bit position, writing a zero effectively corresponds to no action). For x=$k_0$, all $k_0$ blocks are written in simultaneously to their respective sub-arrays, so that the entire probe array is activated in parallel. This gives the highest overall write-rate for the device. Depending on the value of $k_0$, one or more intermediate rates may be selectable corresponding to values of x between 1 and $k_0$. For a given value of $k_0$, x may in principle be selectable as any value from 1 to $k_0$, so that blocks may be written 1, 2, 3, 4, . . . ($k_0$–1), $k_0$ blocks at a time until all $k_0$ blocks have been written. Of course, if x is selected such that $k_0$ is not exactly divisible by x, then the last set of blocks written will contain less than x blocks according to the remainder of $k_0$/x. However, the point is that blocks are written x at a time until all $k_0$ blocks have been written. Moreover, depending on the value of $k_0$, not all values of x between 1 and $k_0$ may provide different overall write-rates. For example, if x=$k_0$/2, then the $k_0$ blocks will be written in two sets of $k_0$/2 blocks, giving a rate of half the maximum possible write-rate.

Any value of x in the range $k_0/2 < x < k_0$ will also require writing of the $k_0$ blocks in two sets, one of x blocks and one of ($k_0$–x) blocks, thus giving the same overall write-rate as x=$k_0$/2. In general, therefore, the series of selectable values of x in read/write controller 29 will be chosen from the possible values given by x=1, 2, 3, 4, . . . ($k_0$–1), or $k_0$ to give a desired set of available write-rates in the device 25. This will depend on the data rates at which user data may be supplied to the device in operation, for example by different application/device interfaces. Thus, the series of values of x can be chosen to accommodate the data rates of a variety of different interfaces. The appropriate value of x for a given write operation can then be selected by read/write controller 29 based on a rate selection input indicating the interface supplying the user data for the write operation.

The stored data can similarly be read from the A-field array at one of a series of rates. In particular, under control of read/write controller 29, successive groups of $k_0$ blocks can be read from the $k_0$ sub-arrays by array driver 28 reading y sub-arrays at a time. Again, the value of y here is selected by read/write controller 29 to be one of a predetermined series of values in the range $1 \leq y \leq k_0$, with y=1 providing the lowest overall read-rate and y=$k_0$ providing the highest overall read rate. The particular value of y is selected in dependence on a rate selection input supplied to read/write controller 29 and indicating a desired data read-rate for the current read operation. The above comments concerning the series of selectable values of x in the write process apply correspondingly to the series of selectable values of y here. Thus, the series of values of y can be chosen to accommodate the data rates of a variety of different interfaces to which data may be supplied in use. The read/write controller 29 then selects the appropriate value for a current read operation based on a rate selection input indicating the interface to which the data is to be supplied. Each group of $k_0$ blocks is then read from the $k_0$ sub-arrays by reading y sub-arrays at a time until all $k_0$ sub-arrays have been read. Under control of read/write controller 29, the $k_0$ blocks are supplied, bit by bit, via de-multiplexer 32 to data recovery block 33 which performs the inverse of the processing performed by data formatter 30, outputting the recovered user data at the required rate to the appropriate interface.

It will be seen that, in the above embodiment, the inherent parallelism of the probe-based array is exploited through the use of sub-arrays to provide selectable write and read rates in device 25, providing a highly flexible storage device which can accommodate a range of different interfaces. Data written at different rates can coexist on the storage surface, and data can be read from the storage array at any one of the available rates, regardless of the rate at which that data was written.

While the particular embodiment of FIG. 5 provides for different read/write rates to be selected for different read/write operations, it will be appreciated that other embodiments may be configured on the same basis to operate with single read and write rates. For example, if the storage device is to exchange data with only a single interface in use, the read and write rates can be preselected from the possible rates to accommodate that particular interface in all read and write operations. Such a device then operates with a single, preselected value of x, and a single preselected value of y, where x and y will usually, though not necessarily, be equal. Such a device, operating with preselected write and read rates, constitutes apparatus embodying the third aspect of the invention.

A third probe-based storage device will now be described with reference to FIG. 7. The device 35 of this embodiment combines the control apparatus of both the first and second embodiments described above, and is indicated in highly schematic form in the figure. In particular, the probe-based array is indicated schematically by storage field array 36 which provides A storage fields logically divided into $k_0$ sub-arrays, SA1 to SA $k_0$, each of $A/k_0$ storage fields as in FIG. 6. The array driver/detector circuitry is omitted for simplicity, but the basic read and write processes are performed via the usual mechanism. Here, however, the control apparatus of FIG. 5 (components 29 to 33 of FIG. 5) is effectively configured as $k_0$ logical sub-devices, labeled SD1 to SD $k_0$ in FIG. 7. Each of these sub-devices comprises the control apparatus of the FIG. 2 embodiment, namely components 7 to 20 of FIG. 2. Each of the $k_0$ sub-devices can read and write data to a respective sub-array SA1 to SA $k_0$ as indicated in FIG. 7.

In a given write operation, for each successive group of $k_0$ blocks of the user data to be written, the $k_0$ blocks are supplied to respective sub-devices SD1 to SD $k_0$. In each sub-device, the user block is processed as described above with reference to FIGS. 2 to 4, and is then written to the respective sub-array SA1 to SA $k_0$. Each user block is thus written as $k_1$ bytes in each of the $A/k_0$ storage fields of the corresponding sub-array. In addition, the $k_0$ blocks of each group can be written to their respective sub-arrays at a selectable rate of $1 \leq x \leq k_0$ blocks at a time, as described with reference to FIGS. 5 and 6, in dependence on a desired data rate for the write operation. Similarly, successive groups of $k_0$ blocks can be read from array 36 by reading $1 \leq y \leq k_0$ sub-arrays at a time, where y is selected based on the desired data rate for the read operation as described above. The data read from a given sub-array by its associated sub-device is then processed as described with reference to FIGS. 2 to 4 to recover the original user block. Device 35 thus combines the advantages of both the earlier embodiments, providing flexible write/read rates together with a high degree of error tolerance.

Figure 7:
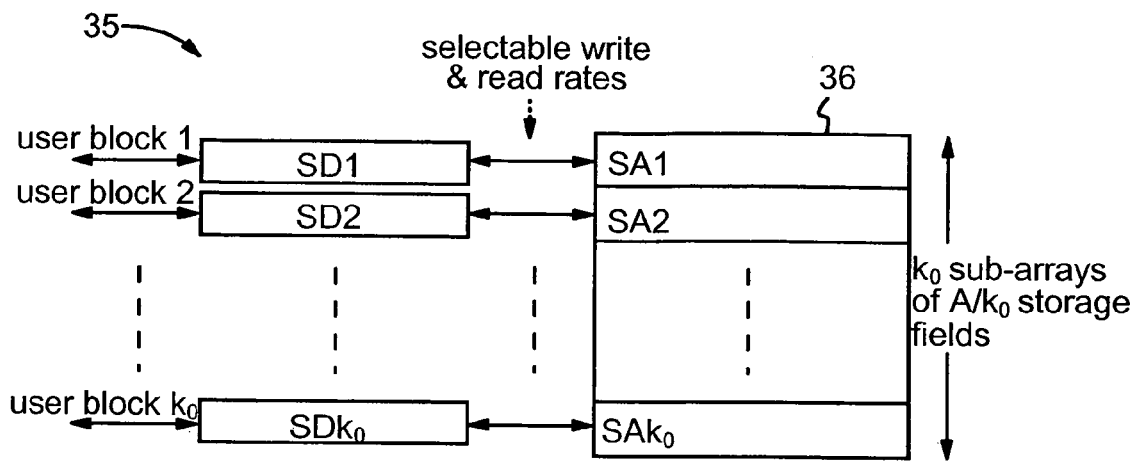
FIG. 7 is a schematic representation of a third probe-based storage device embodying the invention.
Figure 8:
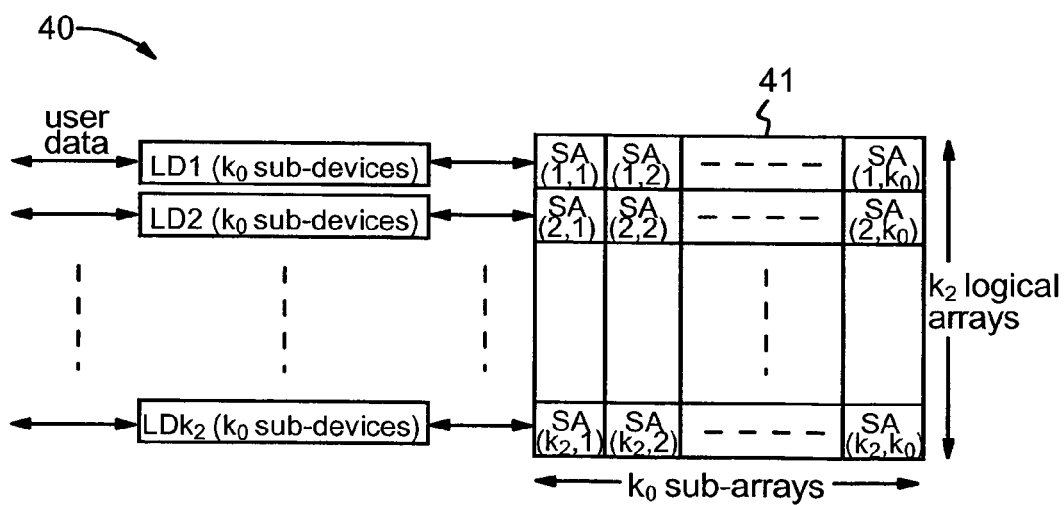
FIG. 8 is a schematic representation of a fourth probe-based storage device embodying the invention.

The device 35 of FIG. 7 may itself be a logical sub-device of a probe-based storage device as illustrated schematically in FIG. 8. The device 40 of this embodiment has a probe storage array represented schematically by storage field array 41 in the figure. The physical array 41 comprises A storage fields, configured as $k_2$ logical arrays of $A_d = A/k_2$ storage fields. Each of the $k_2$ logical arrays is thus a sub-array of the overall physical array. Moreover, each of the $k_2$ logical arrays is further divided into $k_0$ logical sub-arrays SA, each having $A_s = A_d/k_0 = A/(k_0 \cdot k_2)$ storage fields. The resulting sub-arrays are labeled (u,v) in the figure, where $1 \leq u \leq k_2$ represents the number of the logical array, and $1 \leq v \leq k_0$ represents the particular sub-array number within that logical array. The overall control apparatus of device 40 is similarly logically divided into $k_2$ sub-devices, represented by logical devices LD1 to LD$k_2$ in the figure. Each logical device LD1 to LD$k_2$ comprises the control apparatus of FIG. 7, and thus itself comprises $k_0$ logical sub-devices SD1 to SD$k_0$.

In operation of device 40, each of the $k_2$ logical devices LD1 to LD$k_2$ can read and write data in a respective one of the $k_2$ logical arrays. Within each logical device, each of the $k_0$ logical sub-devices SD1 to SD$k_0$ can read and write data in a respective one of the $k_0$ logical sub-arrays SA in that logical array. In a write process, user data streams can be supplied to respective logical devices LD1 to LD$k_2$, each logical device writing the data to its corresponding logical array as described with reference to FIG. 7. Each logical device LD1 to LD$k_2$ can similarly read data from its respective logical array as described with reference to FIG. 7. Again, therefore, device 40 combines the advantages of the first and second embodiments described above, with the additional capability to handle multiple data streams in parallel if desired.

Note that, in the embodiments of FIGS. 7 and 8, the parameters $k_0$, $k_1$ and $k_2$ (as appropriate) may be selectable in operation, allowing the division of the physical storage array into logical sub-arrays to be configured as desired. For example, together with the values of r and C discussed earlier, these parameters may be selectable (e.g. via system controller 20 of FIG. 2) to give sub-arrays sized to cope with particular user block sizes and/or providing a required range of read/write rates. The following examples illustrate how the various parameters might be configured in different ways for a given physical array size, here of 4096 storage fields.

EXAMPLE 1

Physical array size A=4096 storage fields; user block size=576 bytes; r=4; $A_d$=512 storage fields; $A_s$=16 storage fields; $k_0$=512/16=32; $k_1$=576/16=36; and $k_2$=4096/512=8.

EXAMPLE 2

Physical array size A=4096 storage fields; user block size=576 bytes; r=4; $A_d$=512 storage fields; $A_s$=32 storage fields; $k_0$=512/32=16; $k_1$=576/32=18; and $k_2$=4096/512=8.

EXAMPLE 3

Physical array size A=4096 storage fields; user block size=4096 bytes; r=16; $A_d$=512 storage fields; $A_s$=32 storage fields; $k_0$=512/32=16; $k_1$=4096/32=128; and $k_2$=4096/512=8.

It will be appreciated that the read/write control systems of embodiments of the invention can support various host interfaces for probe-based storage devices having various array and storage field sizes, and provide tolerance to various types of errors. Independent write and read rates, as well as variations in these rates, are supported. Embodiments of the invention can be employed with any probe-storage array, regardless of the particular probe technology and array addressing scheme employed. It will of course be appreciated that, while preferred embodiments have been described in detail above, many changes and modifications can be made to the embodiments described without departing from the scope of the invention.

Therefore, while there has been described what is presently considered to be the preferred embodiment, it will be understood by those skilled in the art that other modifications can be made within the spirit of the invention.

What is claimed is:

1. A method for writing a user data block to an array of A storage fields of a probe-based data storage device in which data is written to the array of storage fields by a corresponding array of probes, the method comprising:
    coding the user data block to produce a plurality of C-byte codewords such that $r*C = k_1*A$ where r is the number of codewords and $k_1$ is an integer>1;
    producing A sub-blocks of $k_1$ bytes from the codewords by selecting successive bytes of each sub-block cyclically from the r codewords; and
    writing the A sub-blocks via respective probes to the corresponding storage fields of the storage field array, such that the codewords are distributed across the A storage fields of the storage array, with bytes from the same codeword always being r bytes apart;
    wherein by appropriate selection of the values of r and C in the coding process, the system can be employed with any array size A and can accommodate any size of user data block.

2. The method of claim 1 wherein each C-byte codeword includes an error correction code for that codeword.

3. The method of claim 1 wherein, in the step of producing the A sub-blocks, the first byte of each sub-block is selected from the same codeword.

4. The method of claim 1, wherein the array of A storage fields comprises at least one row of storage fields and in which bits are written simultaneously to corresponding bit positions in a row of storage fields, and wherein, in the step of producing the A sub-blocks, the first bytes of respective sub-blocks to be written in successive storage fields of a row are selected cyclically from the r codewords.

5. The method of claim 1, further comprising (d,k)-coding each sub-block to produce a coded sub-block, wherein the step of writing the A sub-blocks comprises writing the A coded sub-blocks to said corresponding storage fields.

6. An apparatus for controlling writing of a user data block to an array of A storage fields of a probe-based data storage device in which data is written to the array of storage fields by a corresponding array of probes, the apparatus comprising:
a codeword generator for coding the user data block to produce a plurality of C-byte codewords such that $r*C=k_1*A$ where r is the number of codewords and $k_1$ is an integer>1;
a sub-block generator for producing A sub-blocks of $k_1$ bytes from the codewords by selecting successive bytes of each sub-block cyclically from the r codewords;
a write controller for controlling writing of the A sub-blocks via respective probes to the corresponding storage fields of the storage field array such that the codewords are distributed across the A storage fields of the storage array, with bytes from the same codeword always being r bytes apart; and
a probe storage array comprising a storage surface providing the array of A storage fields and a corresponding array of probes.

7. The apparatus of claim 6 wherein each C-byte codeword produced by the codeword generator includes an error correction code for that codeword.

8. The apparatus of claim 6 wherein the sub-block generator is arranged to select the first byte of each sub-block from the same codeword.

9. The apparatus of claim 6, wherein the array of A storage fields comprises at least one row of storage fields and in which bits are written simultaneously to corresponding bit positions in a row of storage fields, and wherein the sub-block generator is arranged to select the first bytes of respective sub-blocks to be written in successive storage fields of a row cyclically from the r codewords.

10. The apparatus of claim 6, further comprising a coder for (d,k)-coding each sub-block to produce a coded sub-block, wherein the write controller is arranged to write the A coded sub-blocks to said corresponding storage fields.

11. A computer readable medium including computer instructions for writing a user data block to an array of A storage fields of a probe-based data storage device, wherein data is written to the array of storage fields by a corresponding array of probes, the computer instructions including instructions for:
coding the user data block to produce a plurality of C-byte codewords such that $r*C=k_1*A$ where r is the number of codewords and $k_1$ is an integer>1;
producing A sub-blocks of $k_1$ bytes from the codewords by selecting successive bytes of each sub-block cyclically from the r codewords; and
writing the A sub-blocks via respective probes to the corresponding storage fields of the storage field array such that the codewords are distributed across the A storage fields of the storage array, with bytes from the same codeword always being r bytes apart;
wherein by appropriate selection of the values of r and C in the coding process, the system can be employed with any array size A and can accommodate any size of user data block.

12. The computer readable medium of claim 11, wherein each C-byte codeword includes an error correction code for that codeword.

13. The computer readable medium of claim 11, wherein in the instructions for producing the A sub-blocks, the first byte of each sub-block is selected from the same codeword.

14. The computer readable medium of claim 11, wherein the array of A storage fields comprises at least one row of storage fields, wherein bits are written simultaneously to corresponding bit positions in a row of storage fields, and wherein in the instructions for producing the A sub-blocks, the first bytes of respective sub-blocks to be written in successive storage fields of a row are selected cyclically from the r codewords.

15. The computer readable medium of claim 11, further comprising instructions for (d,k)-coding each sub-block to produce a coded sub-block, wherein the instructions for writing the A sub-blocks comprises writing the A coded sub-blocks to said corresponding storage fields.

* * * * *